US006467216B2

(12) United States Patent
McManus et al.

(10) Patent No.: US 6,467,216 B2
(45) Date of Patent: Oct. 22, 2002

(54) LIQUID GRAVITY FEED ANT ELIMINATION SYSTEM AND METHOD

(75) Inventors: Robert E. McManus, Needham, MA (US); Kenneth J. Kupfer, Nokomis, FL (US)

(73) Assignee: KM Ant Pro LLC, Nokomis, FL (US)

( * ) Notice: Subject to any disclaimer, the term of this patent is extended or adjusted under 35 U.S.C. 154(b) by 0 days.

(21) Appl. No.: 09/904,702

(22) Filed: Jul. 13, 2001

(65) Prior Publication Data

US 2002/0095856 A1 Jul. 25, 2002

Related U.S. Application Data

(60) Provisional application No. 60/262,797, filed on Jan. 22, 2001.

(51) Int. Cl.$^7$ .................................................. A01M 1/20
(52) U.S. Cl. ........................................ 43/131; 43/132.1
(58) Field of Search ................................. 43/131, 132.1

(56) References Cited

U.S. PATENT DOCUMENTS

| | | | | |
|---|---|---|---|---|
| 1,139,030 A | * | 5/1915 | Goldhammer | 43/131 |
| 1,994,859 A | * | 3/1935 | Langum | 43/131 |
| 2,725,665 A | * | 12/1955 | Mullen et al. | 43/131 |
| 2,750,707 A | * | 6/1956 | Ekstedt | 43/131 |
| 3,122,857 A | * | 3/1964 | Yates | 43/131 |
| 4,662,103 A | * | 5/1987 | Cheng | 43/131 |
| 4,840,143 A | * | 6/1989 | Simon | 119/52.1 |
| 5,501,033 A | * | 3/1996 | Wefler | 43/131 |
| 5,667,816 A | * | 9/1997 | Moss | 424/659 |
| 5,746,021 A | * | 5/1998 | Green | 43/131 |
| 5,839,221 A | * | 11/1998 | Ron et al. | 43/132.1 |
| 5,943,816 A | * | 8/1999 | Hyatt et al. | 43/131 |
| 6,220,525 B1 | * | 4/2001 | McSherdon | 43/132.1 |
| 6,223,465 B1 | * | 5/2001 | Soller et al. | 43/131 |

* cited by examiner

Primary Examiner—Peter M. Poon
Assistant Examiner—Joan M. Olszewski
(74) Attorney, Agent, or Firm—Gifford, Krass, Groh, Sprinkle, Anderson & Citkowski, P.C.

(57) ABSTRACT

There is provided an insect attractant and elimination platform, the platform featuring an environment-tolerant, high volume, continuous liquid feed device and method for the eradications of ants, insects, and other pests. Preferably, the invention includes a reservoir for storing a predetermined quantity of liquid bait; a base in cooperation with the reservoir for receiving predetermined quantities of liquid bait accessible to the insect pests; and a stabilizing device removably attached to the base for favorable positioning of the device. A weather shield is integrated or cooperates with the reservoir portion of the device to protect the liquid bait from damaging environmental elements.

10 Claims, 3 Drawing Sheets

LIQUID GRAVITY FEED ANT ELIMINATION SYSTEM AND METHOD

REFERENCE TO RELATED APPLICATIONS

This application claims priority of U.S. provisional patent application Ser. No. 60/262,797 filed Jan. 22, 2001, the entire content of which is incorporated herein by reference.

BACKGROUND OF THE INVENTION

1. Field of the Invention

This invention relates to the field of insect pest control and provides a weather-tolerant, high volume, continuous feed liquid ant bait delivery platform to eliminate various insect or pest species and their colonies.

2. Description of the Prior Art

There are currently two ant species that are increasingly causing significant agricultural damage, as well as personal injury, and in some well-documented cases, death to humans and animals.

The imported fire ant (*solenopsis invieta*) from South America is believed to have entered the United States through the seaport of Mobile, Ala. in the late 1930's. These fire ants have spread throughout the southern United States and are currently infesting over 310 million acres (Reference: U.S. Department of Agricultural Research Service, 9–21, 1999 "Red Imported Fired Ants . . . still going: by Tar Weaver Missick). The imported fire ants are aggressive in nature, and annually destroy crops and wildlife costing hundreds of millions of dollars in damage. They are a stinging ant and cause hypersensitivity reactions as well as infections.

The second ant specie is the white-footed ant (*technomyrmex albipes*). The white-footed ant is a native of Japan, and was discovered in the United States in southeast Florida in 1990. The white-footed ant has spread and now has a confirmed population in seven Florida counties. This specie of ant is responsible for crop and landscape damage mainly because it protects and cares for crop destroying insects in order to harvest their honeydew. The white-footed ants reproduce at a much greater rate than all other species inhabiting the United States (Reference: University of Florida Department of Entomology and Nemotology—'Pest Alert', Aug. 19, 1998 "White footed ant on the move in Florida" by Dr. Tweissling). The population in each of their colonies can exceed well over two million inhabitants.

In outdoor environments, ants primarily subsist on water and various foods. Thus, the current art employs both dry and liquid forms of attractants to bait the ants as they forage for water and food. The bait poisons the ants by ingestion or absorption, or entices the ants into a trap device, whereafter they are eliminated by various means.

Older examples of art include U.S. Pat. No. 1,372,780 to Schenke that discloses a bell shaped top having side apertures, the top fitting over and clamping to a dish shaped base. U.S. Pat. No. 2,123,995 to Harrom that discloses a flat piece of sheet metal bent over an insecticide to partially cover the substance while allowing insects direct access. U.S. Pat. No. 2,977,711 to Starr discloses a poison bait station for exterminating rodents that embodies a shield or housing and a base. U.S. Pat. No. 4,251,946 to Lindley discloses a trap for snails and slugs which includes a housing with pesticide disposed therein, the housing having multiple doorways to permit ready entry by the snails and slugs, which doorways are closable to permit easy disposal and shipment, and U.S. Pat. No. 4,563,836 to Woodruff discloses an insect feeding station comprised of a simple cover that fits over a base.

U.S. Pat. No. 5,152,097 to Rhodes discloses a poison dispenser that holds a poison in solid form for fire ants and other small insects. The dispenser includes a base adapted to be staked to the ground in an infested area, and a roof supported on the base by an upstanding tubular member. The roof extends down over the base almost to the ground to define a narrow space around the perimeter of the trap to enable ants and other insects to enter the enclosure. A quantity of poison bait is placed within the upstanding tubular member.

U.S. Pat. No. 1,573,278 to Schlesinger discloses a poison liquid container for eliminating ants. The poison liquid container includes a base having a wall, a wick and a cover. Openings are provided at the bottom of the wall so that ants may have access to the interior of the wall. The wick is disposed in a recess of the wall and extends above the base. Poison liquid is poured onto the wick so that the ants may feed thereon. The cover prevents spillage of the poison.

Similarly, U.S. Pat. No. 5,033,229 to Demarest discloses a bait station for the control of insects, especially roaches, that has a reservoir portion for holding a liquid bait-toxicant formulation that fits into a base structure. The base structure has around its circumference a ramped structure that defines a central well area. Rising from the ramped structure are a plurality of support walls that both support the reservoir portion and define access openings to the central well area. The bait-toxicant formulation is controllably released from the reservoir into the central well area.

U.S. Pat. No. 5,548,922 to Wefler discloses an insect bait station for offering a liquid insect bait to targeted insects and a method of offering liquid insect bait to targeted insects. The insect bait station includes a hollow body having a base and a cover joined in liquid-tight relation. The base has a floor and the cover has a stage positioned generally parallel to and above the floor of the base. The cover has an ascending ramp that extends upwardly from the cover rim to a cover mount, and a descending ramp that extends downwardly from the cover mount to the stage. Interiorly facing surfaces of the floor and cover define a holding chamber wherein liquid insect bait may be confined. Spill-resistant access means provides a targeted insect located on the stage access to liquid insect bait confined within the holding chamber. Preferably, the spill-resistant access means includes a capillary liquid transport means for transporting the liquid insect bait upwardly from the floor of the base to a location where it is accessible to a targeted insect. The method includes the steps of providing an insect bait station made in accordance with the specification and placing it in a location frequented by the targeted insects.

In view of the foregoing, the prior and current art provide various means for eliminating ants in an outdoor environment. Current means generally consists of dry baits and liquid formulations that are either spread on the ground or placed in containers. Ants often ignore dry baits, due to fluctuations in temperature and humidity. Furthermore, dry baits often decompose under various environmental conditions. Liquid baits evaporate under various environmental conditions, resulting in increased toxicity of the liquid bait. The increased toxicity tends to kill worker ants before the worker ant can return to and feed its colony, thus greatly decreasing the overall effectiveness of the liquid bait. Decomposition of both dry and liquid bait also greatly reduces the efficacy of the bait.

It is desirable, therefore, to provide an effective elimination system for insects or other pests that lures and eradicates the intended pests via use of slow-acting, low toxic liquid bait. Further, it is desirable to provide such a system having continuous flow whereby a quantity of attractant or poison can be maintained without the frequent, burdensome refill of the same. Finally, such a system should provide adequate protection to the liquid contents thereof, while substantially prohibiting access to the liquids by those for whom and which it is not intended.

SUMMARY OF THE INVENTION

The present invention addresses the longstanding, but heretofore unresolved, issues noted in the prior and current art with a Liquid Gravity Feed Ant Elimination System (hereafter, LGFAES). The LGFAES provides a low-maintenance, weather resistant ant elimination system via a practical, safe mechanical liquid delivery platform designed for use with a low-toxic liquid attractant or poison. The LGFAES dispenses a controlled amount of low toxic liquid bait over an extensive period of time under outdoor weather conditions with greatly reduced liquid loss resulting from evaporation.

Preferably, the LGFAES includes reservoir, base, and a stabilizing device. It is contemplated that the reservoir receives and stores a predetermined amount of liquid attractant, poison, or a combination of the same. Preferably, the reservoir functions as, or cooperates with, a shield. The shield provides protection for the liquid contents from the elements, environmental conditions, and the like.

The base cooperates with the reservoir to receive a relatively small amount of liquid therefrom. The attractant portion of the liquid lures the ants toward the LGFAES, and to the liquid itself. Once the ants locate the liquid and ingest it, they carry it back to the colony and expose the colony to the toxin which substantially eliminates the colony in its entirety. Certain liquid toxins may be used in conjunction with the LGFAES for mass remote extermination of a colony of insects. For example, a single ant contacts the toxin in the LGFAES, carries the same back to its colony, and exposes the colony to the toxin, which substantially eliminates the colony in its entirety. The base also functions to prevent spillage and leakage outside the immediate area of the base. The reservoir, shield, and base serve to discourage access to the liquid contents by those for whom and which it is not intended; i.e., children, small pets, and the same.

The stabilizing device removably attaches to the base to facilitate secure positioning of the LGFAES in the ground. Alternatively, the stabilizing device forms an integral unit with the base of the LGFAES. Generally, the stabilizing device comprises a stake that tapers in a direction away from the base to facilitate easy insertion of the stake into the ground. Once inserted, the stake maintains the position of the LGFAES until removal from the ground. In various embodiments, the stake may be removed and reattached at will from the base of the LGFAES to accommodate various environments and terrains, subject to the requirement of the user.

The foregoing examples represent several embodiments of the present invention; however, a skilled artisan will recognize that the examples in no way limit the invention disclosed herein.

DETAILED DESCRIPTION OF THE INVENTION

The present invention comprehends a liquid gravity feed ant elimination system (LGFAES) to eradicate ants and other insects. The LGFAES system specifically provides a weather-tolerant, high volume, continuous feed liquid ant bait delivery system to eliminate problem-causing insects of various species and their colonies. The term "bait" as used herein, refers to any attractant, poison or combination of the same designed to attract and/or eliminate insects or pests, particularly ants.

Figure 1:
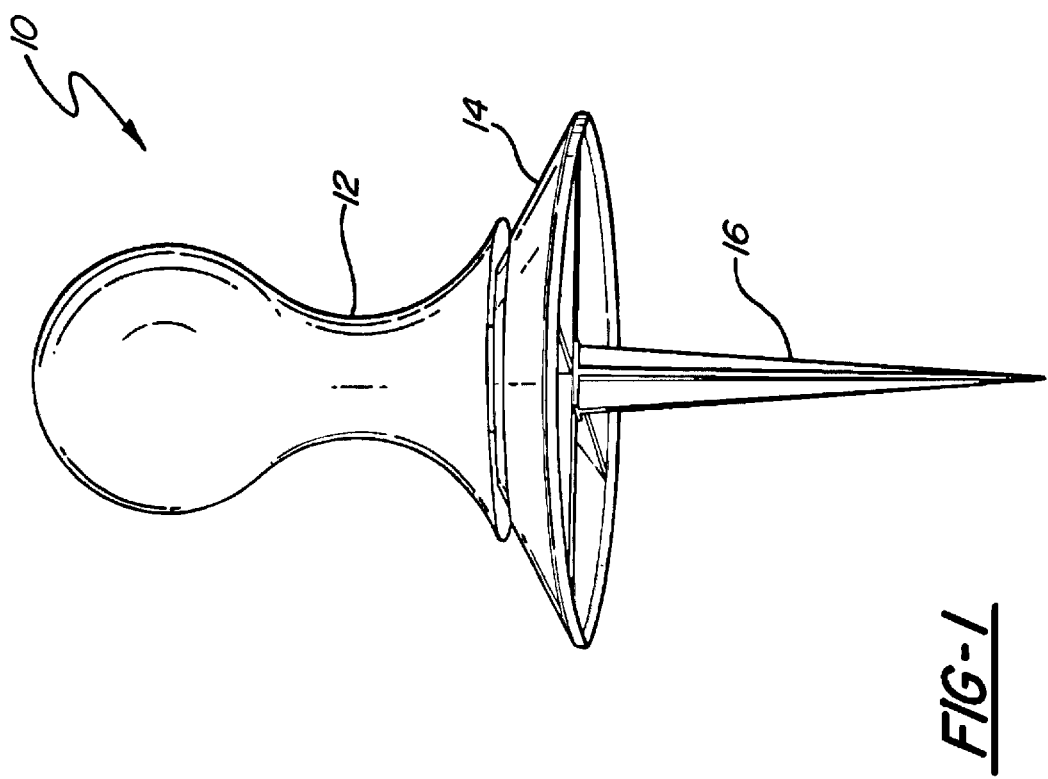
FIG. 1 illustrates a side view of an assembled liquid gravity feed ant elimination system according to the present invention.

Referring now to the drawings wherein like numbers are used to denote like items throughout, FIG. 1 illustrates a general, environmental side view of a first and preferred embodiment of an assembled LGFAES 10. The LGFAES 10 is shown in its open position, as hereinafter described.

Figure 6:
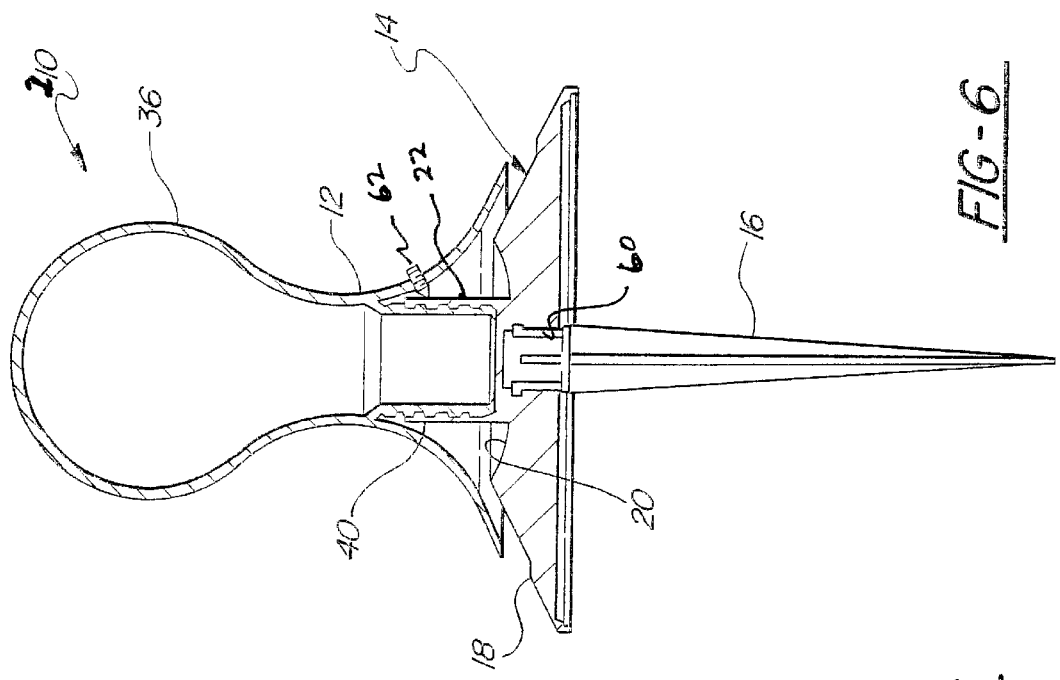
FIG. 6 is a cross-sectional view of the preferred system of FIG. 1.

Turning now to FIG. 6, there is shown a cross-sectional view of the assembled LGFAES 10 according to the present invention. The LGFAES 10 includes a reservoir 11 and with the liquid bait, forms the weather-tolerant, high volume, continuous feed means for eliminating unwanted pests. Preferably, the LGFAES 10 comprises a shield 12; a base 14; and a stake 16, as hereinafter described in detail. The LGFAES 10 is illustrated in the open (activated) position, which permits the ants' access to the LGFAES 10, and therefore the bait, via the base 14.

Figure 3:
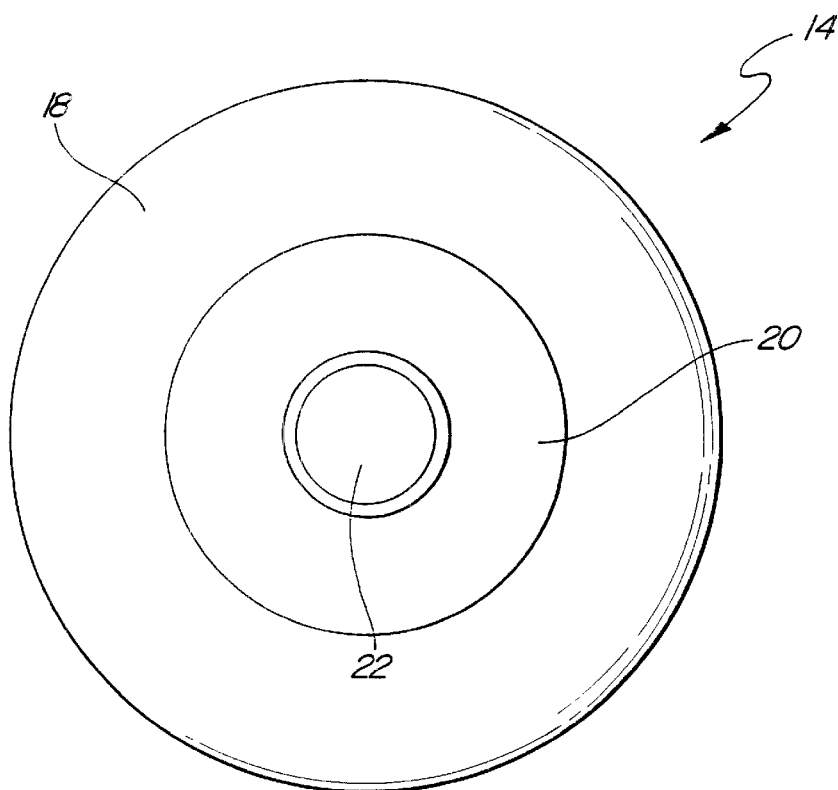
FIG. 3 illustrates a plan view of a base of the liquid gravity feed ant elimination system of FIG. 1.
Figure 4:
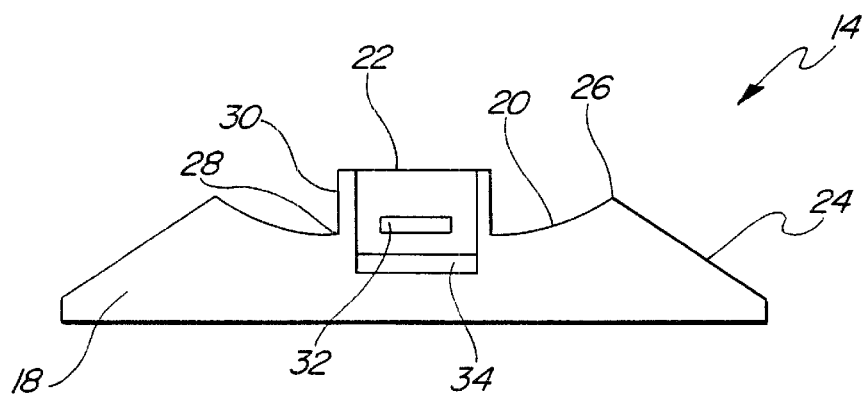
FIG. 4 illustrates a side view in cross section of the base of the liquid gravity feed ant elimination system of FIG. 1.

There is shown in FIGS. 3 and 4 the base 14 of the LGFAES 10. In FIG. 3, the base 14 is shown from a plan perspective, and includes an outer ring 18, a middle ring 20, and a center ring 22. In FIG. 4, the base 14 is shown as a cross-sectional side view. The outer ring 18 includes a ramp 24; the middle ring 20 includes an outer periphery 26 and an inner periphery 28; and the center ring 22 includes a wall 30. The wall 30 of the center ring 22 has at least one aperture; e.g., a horizontal slit 32. The center ring 22 accommodates a gasket 34.

The ramp 24 of the outer ring 18 slopes upward to the middle ring 20, providing an initial approach for the ants to the bait. Typically, the ramp 24 features a textured, tractional incline to facilitate travel of the ants thereover. The ramp 24 of the outer ring 18 terminates at the outer periphery 26 of the middle ring 20.

The middle ring 20 slopes in a concave arc from its outer periphery 26 to its inner periphery 28. The inner periphery 28 forms an integral boundary between the wall 30 of the center ring 22 and the middle ring 20. The middle ring 20 and the wall 30 of the center ring 22 together define a concavity. The concavity serves as a holding area for the liquid bait, and an access point to the liquid bait for the ants.

The center ring 22 essentially forms a hollow stem shape. The wall 30 of the center ring 22 extends in an upward direction from the base 14, and forms a closed loop. The wall 30 of the center ring 22 typically forms two small, opposing horizontal slits 32 therethrough. The horizontal slits 32 function as a liquid tension release stress ducts to aid in controlling the gravity-caused release of the liquid bait into the middle ring 20 as the ants consume the liquid bait. A gasket 34 or similar sealing component is located on an upper surface of the base 14 and within the center ring 22.

Figure 5:
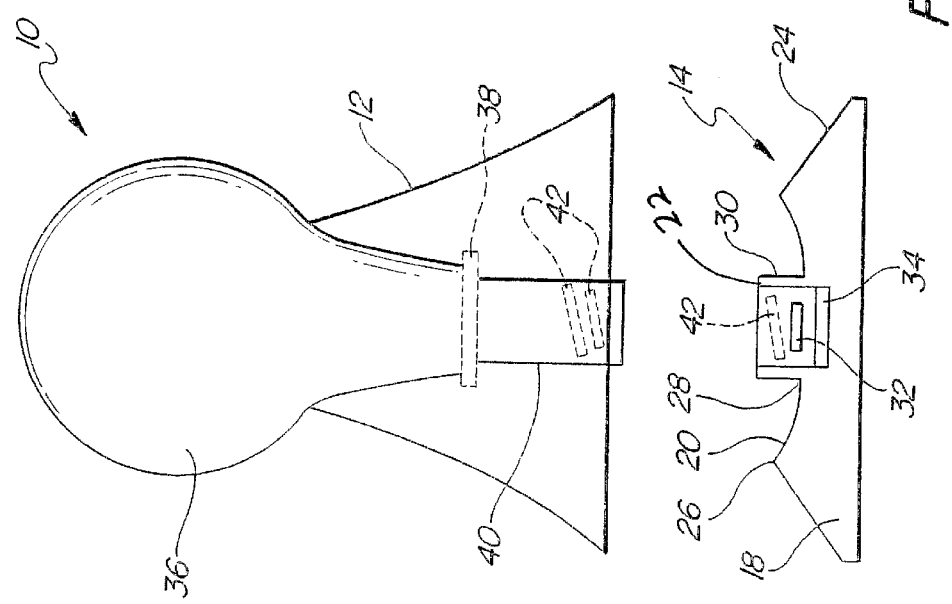
FIG. 5 illustrates a side view in partial cross section of the reservoir, shield, and base components of the liquid gravity feed ant elimination system of FIG. 1.

The base 14 shown in FIGS. 3–5 does not include means for accommodating the stake 16.

Turning now to FIG. 5, there is shown a side view in partial cross section of the LGFAES 10 having a reservoir 36 that includes a connector 38 (shown in phantom lines) and a stem 40 having threading 42 (shown in phantom lines). The connector 38 forms an integral part between the reservoir 36 and the stem 40. Alternatively, the connector 38 exists separately from the reservoir 36 and the stem 40, and mechanically communicates with both the reservoir 36 and the stem 40 to form a conduit for the liquid bait from the reservoir 36 to the base 14.

The shield 12 flares from the reservoir 36 as an integral part thereof, or an attachment thereto, according to predetermined design. The shield 12 typically extends to a length beyond the lower end of the reservoir 36 as well as the outer ring 18, less a narrow portion of an outside periphery. The full coverage of the shield 12 protects the liquid bait from sun, rain and other environmental conditions known to cause evaporation, deterioration, dilution, or other negative results. It is contemplated that the shield may be formed from various materials or combinations of materials, so long as the shield functions in a manner as described herein.

The base 14 contains, in addition to the aforementioned components, threading 42 on an inner surface of the wall 30. The threading 42 on the wall 30 weds with the threading 42 on the stem 40.

FIG. 6 illustrates a form of the LGFAES 10 which includes a recess 60 in the base 14 to receive the stake 16. Also, a locking screw 62 is provided to lock the shield 12 to the base 14.

Figure 2:
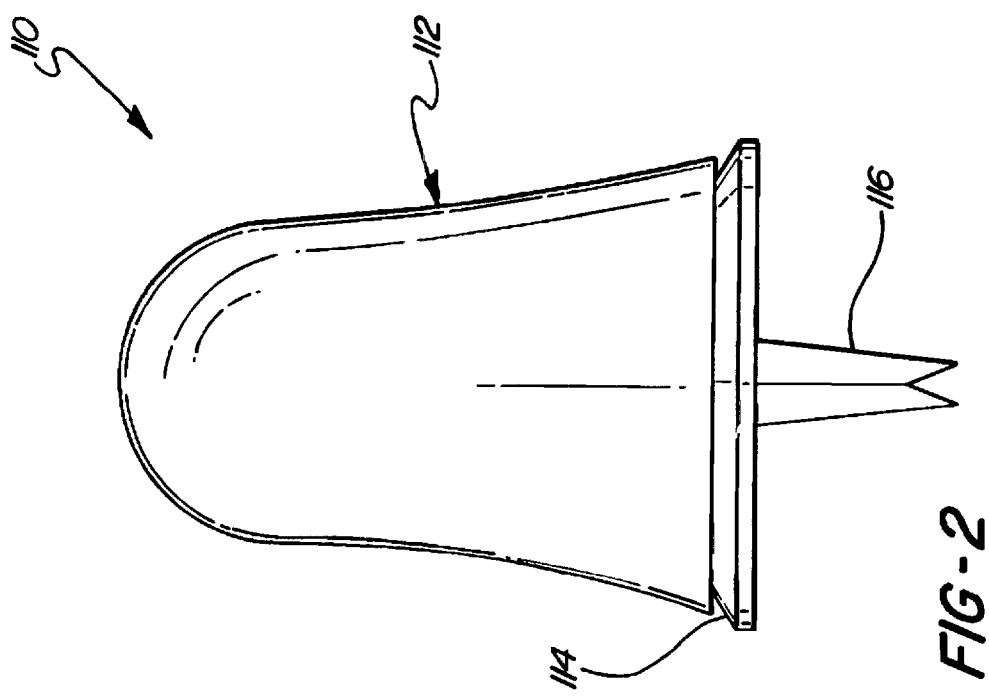
FIG. 2 illustrates a side view of another preferred assembled liquid gravity feed ant elimination system according to the present invention.

FIG. 2 illustrates another preferred embodiment of a LGFAES 110 which includes a shield 112, a base 114 and a stake 116. Except for the shape of the shield 112, the LGFAES 110 is substantially the same as the LGFAES 10 and is intended to be used in the same manner as the LGFAES 10.

It is contemplated that the reservoir 36 receives and stores a quantity of liquid bait; typically enough to supply bait to the ants without replenishment for a period of several weeks. The reservoir 36 receives the bait via the stem 40. It is contemplated that various formulations of liquid bait may be used in conjunction with the LGFAES 10 to eliminate ants. For example, boric acid used in varying strengths and formulations effectively eliminates many species of the insect family, including ants and roaches. In particular, a formula of up to two percent boric acid and the balance as inert ingredients typically produces satisfactory insecticide and pesticide related results.

Once the reservoir 36 receives the liquid bait, the stem 40 screws into, or otherwise removably attaches to, the wall 30 of the center ring 22, via their respective threadings 42. In a closed position, the stem 40 of the LGFAES 10 covers the horizontal slits 32 and contacts the gasket 34, exerting a force thereon to create a seal. The seal prevents the flow of liquid bait from the reservoir 36. In the closed position, the shield 12 contacts or closely approximates the outer ring 18 of the base 14 to prevent entry to the middle ring 20 and to the liquid bait.

When LGFAES 10 is in the open (activated) position, as illustrated in FIGS. 1 and 2, and as can best be seen in FIGS. 4 and 5, the stem 40 is sufficiently unscrewed from the center ring 22 such that no contact remains with the gasket 34. The stem 40 no longer covers the horizontal slits 32, thus permitting the liquid bait to flow in a controlled manner from the reservoir 36, through the stem 40, through the horizontal slits 32 in the center ring 22, and into the middle ring 20. For activation of the LGFAES 10, the threading 42 of the stem 40 may be unscrewed from the threading 42 of the center ring 22, which relocates the shield 12 from its resting place on the outer ring 18 of the base 14, and displaces the shield 12 in an upward direction from the ground to provide an opening between the periphery of the base 14 and the shield 12. This opening permits access by the ants to the liquid bait via the base 14, while restricting access to the same by anyone or anything significantly larger than an insect. For example, in the open position, the shield 12 locates approximately 0.25 inch above the base 14, permitting a full three hundred and sixty degree access to the outer ring 18, the middle ring 20, and the liquid bait.

With reference to FIG. 6, there is shown an alternate embodiment 210 of a liquid gravity feed ant elimination system, the alternate embodiment including a reservoir 36 having a stem 40, and a base 14 having an outer ring 18, a middle ring 20, and a center ring 22. It is contemplated that the alternate embodiment functions in a substantially similar manner to the preferred embodiment described above.

While the foregoing examples describe certain preferred embodiments of the present invention, it is apparent that one skilled in the art could adopt other forms. Accordingly, the scope of the invention is to be limited only by the following claims.

We claim:

1. A device for eliminating ants and other insect pests comprising:

a reservoir for containing a liquid bait;

a stem extending from one end of said reservoir;

a shield integral with said reservoir and extending outwardly therefrom adjacent said stem;

a base having an outer ring, a middle ring and a center ring, and means mounting said center ring to said stem to position said shield adjacent said middle ring of said base to shield the contents thereof;

said center ring and said stem including openings providing communication between the interior of said reservoir and said middle ring to permit the liquid bait to flow from said reservoir to said middle ring; and means to selectively close said openings to close fluid communication between said reservoir and said middle ring.

2. The device as defined in claim 1 and in which said mounting means includes a threaded connector between said stem and said base whereby tightening and loosening the threaded connection causes the distance between said shield and said base to be varied.

3. The device as defined in claim 2 and in which said threaded connector comprises said stem being externally threaded and said base having an internally threaded portion to receive said stem.

4. The device as defined in claim 1 and in which said mounting means includes a threaded connector between said stem and said base and tightening of said threaded connector closes said openings to close communication between said reservoir and said middle ring whereby liquid bait contained within said reservoir will be prevented from spilling.

5. The device as defined in claim 1 and in which said mounting means includes a threaded connector between said stem and said base and tightening of said threaded connector variably closes said openings to regulate flow of liquid bait to said middle ring.

6. The device as defined in claim 1 and including means for locking the shield in a selected position with respect to the base.

7. The device as defined in claim 1 and including a stake frictionally attached to said base.

8. The device as defined in claim 1 and in which said shield extends outwardly and downwardly from said reservoir to a position overlying said middle ring to protect the contents thereof.

9. The device as defined in claim 1 and said means for mounting said stem to said base being adjustable to permit the space between said shield and said base to be varied.

10. The device as defined in claim 3 and including a gasket disposed within said base to act as a seal closing the flow of liquid bait from said reservoir to said middle ring when said stem is tightened against said base.

* * * * *